United States Patent [19]

Kataoka

[11] Patent Number: 4,584,101
[45] Date of Patent: Apr. 22, 1986

[54] COFFEE PACKAGE

[75] Inventor: Joji Kataoka, Tokyo, Japan

[73] Assignee: Kataoka Bussan Kabushiki Kaisha, Tokyo, Japan

[21] Appl. No.: 577,326

[22] Filed: Feb. 8, 1984

Related U.S. Application Data

[63] Continuation of Ser. No. 328,514, Dec. 8, 1981, abandoned.

[30] Foreign Application Priority Data

| Dec. 27, 1980 | [JP] | Japan | 55-185091 |
| Mar. 7, 1981 | [JP] | Japan | 56-31751 |
| Mar. 24, 1981 | [JP] | Japan | 56-40286 |
| Apr. 16, 1981 | [JP] | Japan | 56-53789[U] |
| Apr. 16, 1981 | [JP] | Japan | 56-109796[U] |
| Aug. 12, 1981 | [JP] | Japan | 56-118711[U] |
| Aug. 12, 1981 | [JP] | Japan | 56-118712[U] |
| Aug. 14, 1981 | [JP] | Japan | 56-119955[U] |
| Sep. 3, 1981 | [JP] | Japan | 56-130371[U] |

[51] Int. Cl.$^4$ .................................... A47J 31/06
[52] U.S. Cl. ........................ 210/474; 210/497.2; 99/284; 99/295; 99/306; 99/323; 426/78; 426/81; 426/82; 426/124
[58] Field of Search ........ 210/473, 474, 497.2; 99/306, 304, 295, 316, 279, 318, 284, 290, 321, 322, 323; D7/305, 310, 312, 399, 400, 401, 327; 426/77, 78, 79, 80, 81, 82, 83, 84, 112, 115, 124

[56] References Cited

U.S. PATENT DOCUMENTS

| 2,137,243 | 11/1938 | Heyman | 426/77 |
| 2,728,671 | 12/1955 | Young et al. | 206/0.5 |
| 2,800,408 | 7/1957 | Fimple | 99/295 |
| 2,805,164 | 9/1957 | Doppler | 206/0.5 |
| 2,822,273 | 2/1958 | Anderson | 99/295 |
| 3,279,926 | 10/1966 | Aguirre-Batres | 426/82 |
| 3,344,734 | 10/1967 | Aguirre-Batres et al. | 99/304 |
| 3,379,331 | 4/1968 | Kamlet | 426/83 |
| 3,542,566 | 11/1970 | Wakefield | 426/112 |
| 3,579,351 | 5/1971 | Wege et al. | 99/295 |
| 3,615,708 | 10/1971 | Abile-Gal | 426/77 |
| 3,617,311 | 11/1971 | Beltle | 426/112 |
| 3,695,167 | 10/1972 | Schmidt et al. | 99/306 |
| 3,933,451 | 1/1976 | Johansson | 55/376 |
| 3,971,305 | 7/1976 | Daswick | 99/295 |
| 3,985,069 | 10/1976 | Cavalluzzi | 99/295 |
| 4,002,773 | 1/1977 | Entenmann | 426/124 |
| 4,096,948 | 6/1978 | Kuchenbecker | 206/0.5 |
| 4,224,168 | 9/1980 | Tragardh | 210/474 |
| 4,250,990 | 2/1981 | Casper | 206/0.5 |

FOREIGN PATENT DOCUMENTS

| 2131124 | 1/1973 | Fed. Rep. of Germany | 99/295 |
| 2235214 | 1/1974 | Fed. Rep. of Germany | 99/295 |
| 2270161 | 1/1976 | France | 99/323 |
| 2703 | 1/1977 | Japan . | |
| 2028675 | 3/1980 | United Kingdom | 210/497.2 |

OTHER PUBLICATIONS

"Describing a New Type Device . . . ", B. C. Sepesy (Undated) p. 39.
Tea & Coffee Trade J., 1/53, p. 39 plus.

Primary Examiner—Richard V. Fisher
Assistant Examiner—Wanda L. Millard

[57] ABSTRACT

A coffee package has a filter assembly double folded and enveloped air-tight in a wrapper in a vacuous or inert gas atmosphere. The filter assembly includes a generally rectangular support plate made up of an intermediate portion with an opening for pouring hot water therethrough and a pair of support legs connected with opposite sides of the intermediate portion. The support legs are formed with coactive nipping members adjacent to their edges such that, when the support legs are folded upright relative to the intermediate portion, the nipping members are firmly engagable with the upper edge of a receptacle to support the whole assembly in the raised position for use. A sack of filter paper open at one end is filled with a weighed volume of coffee powder and adhered to the back of the support plate to cover the opening in the support plate. The opening in the support plate may be formed in the production stages of the coffee package or defined by a lid which is removable from the support plate when coffee is to be served.

15 Claims, 30 Drawing Figures

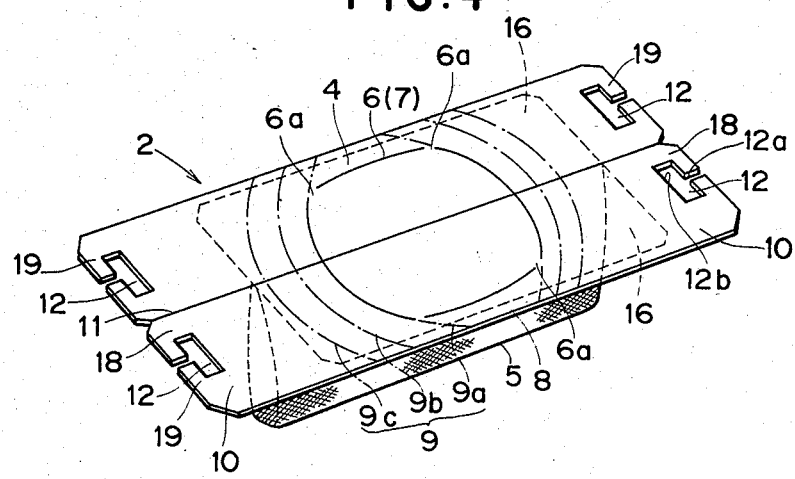
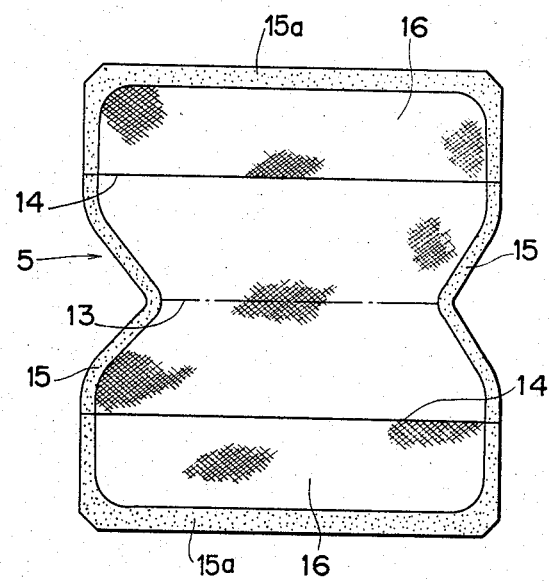

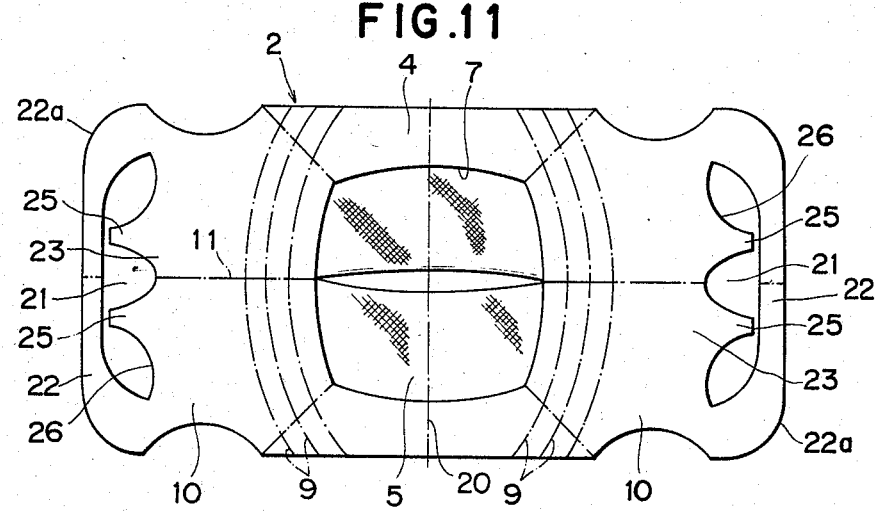
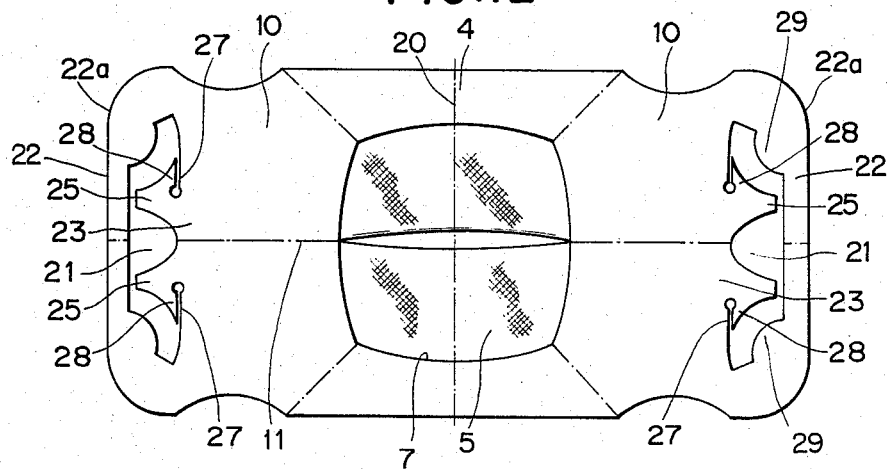
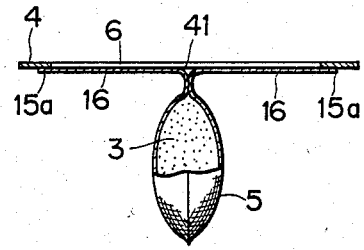

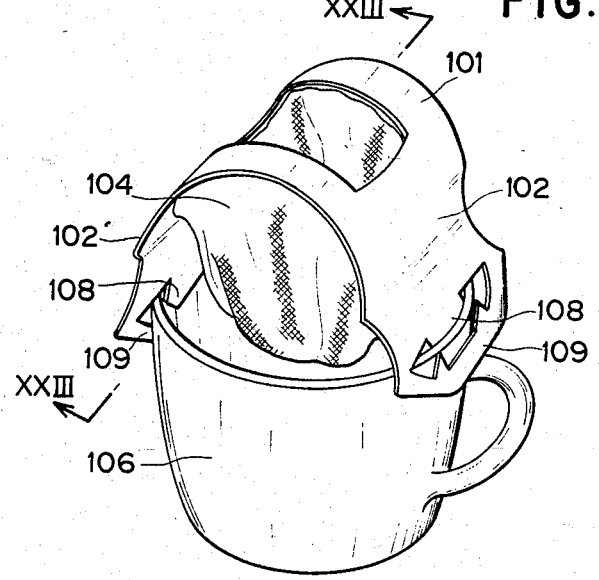
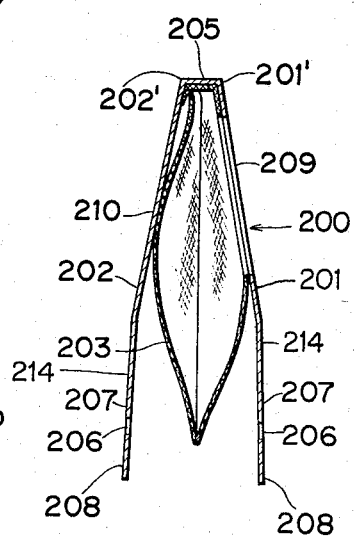
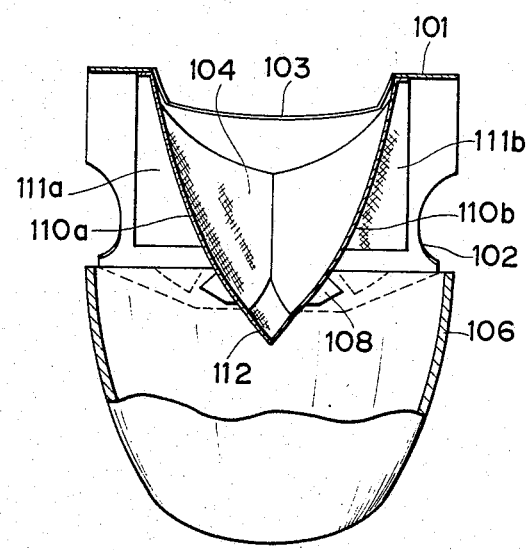

COFFEE PACKAGE

This application is a continuation of application Ser. No. 328,514, filed Dec. 8, 1981 now abandoned.

Background of the Invention

The present invention generally relates to packages containing weighed amounts of coffee powder therein and, more particularly, to a coffee package which envelopes therein an integral assembly of a volume of parched coffee powder and a filter for filtering the coffee powder.

Coffee is generally marketed in a state of parched beans or a powder prepared by grinding the parched beans. Parched coffee in the form of beans or a powder are usually sold packed air-tight because it is susceptible to degeneration due to absorption of oxygen, moisture or the like. A major problem inherent in this type of packages originates from the fact that an ordinary volume of coffee contained in each package is fully sufficient for 30 to 40 persons. When a volume of coffee sufficient for a relatively small number of persons is required, the unsealing of such a package causes the rest of the content to be exposed to moisture despite the original air-tight design of the package. Therefore, once unsealed, the package must be emptied into a second container which is capable of air-tight storage.

Various devices are known for drawing liquid coffee in hot water and filtering it to provide coffee ready to be drunk, e.g. percolators, siphons and drip-type filters. Though safely implementing the needs, such devices lack the convenience persons would experience in drinking instant coffee.

SUMMARY OF THE INVENTION

It is an object of the present invention to provide a coffee package which includes a volume of parched coffee powder, a filter assembly for drawing liquid coffee from the coffee powder, and a wrapper in which the coffee powder and filter assembly are hermetically sealed as a unitary body, so that fresh coffee can be readily served merely by unsealing the package, framing the filter assembly through a simple procedure and pouring hot water into the filter assembly.

In order to achieve this object, a coffee package embodying the present invention comprises a filter assembly made up of a support plate having a pair of support legs and an intermediate portion which connects to the support plates at its opposite sides, respectively, the intermediate portion being adapted to define an opening for pouring hot water, a filter accommodating a weighed amount of coffee powder therein and bonded to the support plate in such a manner as to cover the opening, and a wrapper for sealingly storing the filter which carries the coffee powder. The filter sack is filled with a predetermined volume of coffee powder. During storage, the filter sack is stably sealed in the wrapper with the coffee powder prevented from leakage by, for example, a removable lid portion of the support plate which stops an open end of the filter sack. To serve coffee, one will position the support legs upright to cause the filter assembly to stand by itself on a coffee cup or like receptacle, remove the lid portion to define an opening in the support plate, and then pour hot water into the filter sack through the opening to extract liquid coffee directly into the receptacle. Thus, the coffee powder can be sealed in the wrapper and, when desired, processed to yield fresh filtered coffee in a very convenient way.

It is another object of the present invention to provide a coffee package in which the amount of coffee powder filled in a filter assembly serves a relatively small number of persons such as one or two to promote consumption of the entire coffee powder once the package is opened and thereby settle the problem concerned with the remaining amount heretofore experienced, the small amount of powder also making the whole package small in size and, therefore, quite handy.

It is a further object of the present invention to provide a coffee package in which a filter assembly is hermetically sealed in a wrapper after being filled with coffee powder to render an anti-oxidation step for preventing oxidation of the content as well as rendering manual work therefore easy and complete to afford excellent storability to the coffee powder. The anti-oxidation step may consist in evacuating the wrapper or filling it with an inert gas.

Other objects, together with the foregoing, are attained in the embodiments described in the following description and illustrated in the accompanying drawings.

BRIEF DESCRIPTION OF THE DRAWINGS

FIG. 4 is a developed perspective view of the filter assembly;

FIG. 6 is a developed view of a filter sack;

FIGS. 10-12 are plan views of different examples of the filter assembly applicable to the present invention;

FIG. 16 is a section taken along line XVI—XVI of FIG. 15;

FIGS. 22 and 23 are a plan view and a section along line XXIII—XXIII of FIG. 22, respectively, showing the filter assembly of FIGS. 18-20 in use;

FIG. 25 is a section along line XXV—XXV of FIG. 24;

DESCRIPTION OF THE PREFERRED EMBODIMENTS

Figure 1:
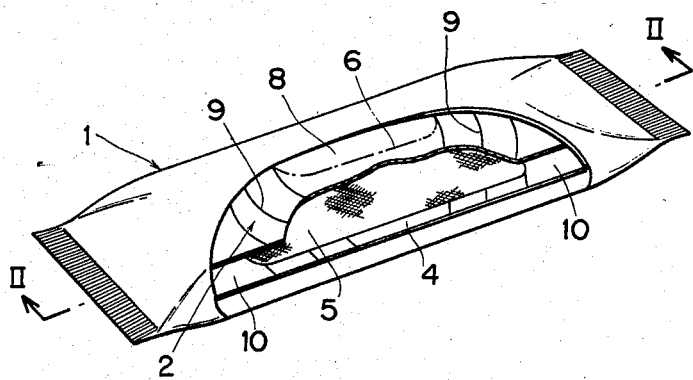
FIG. 1 is a partly broken away perspective view of a coffee package embodying the present invention.
Figure 2:
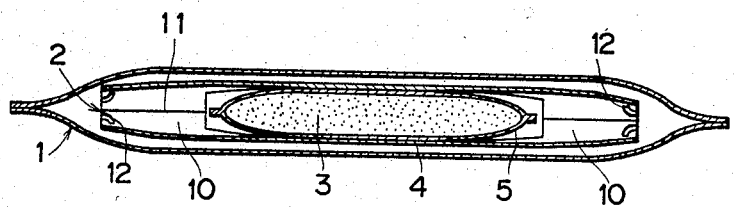
FIG. 2 is a section taken along line II—II of FIG. 1.
Figure 3:
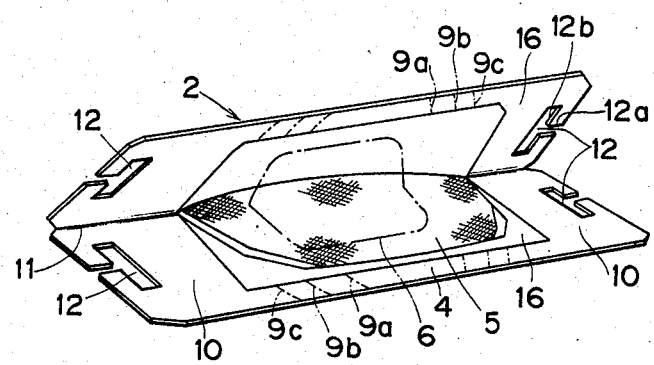
FIG. 3 is a perspective view of a filter assembly and its double folding manner.
Figure 5:
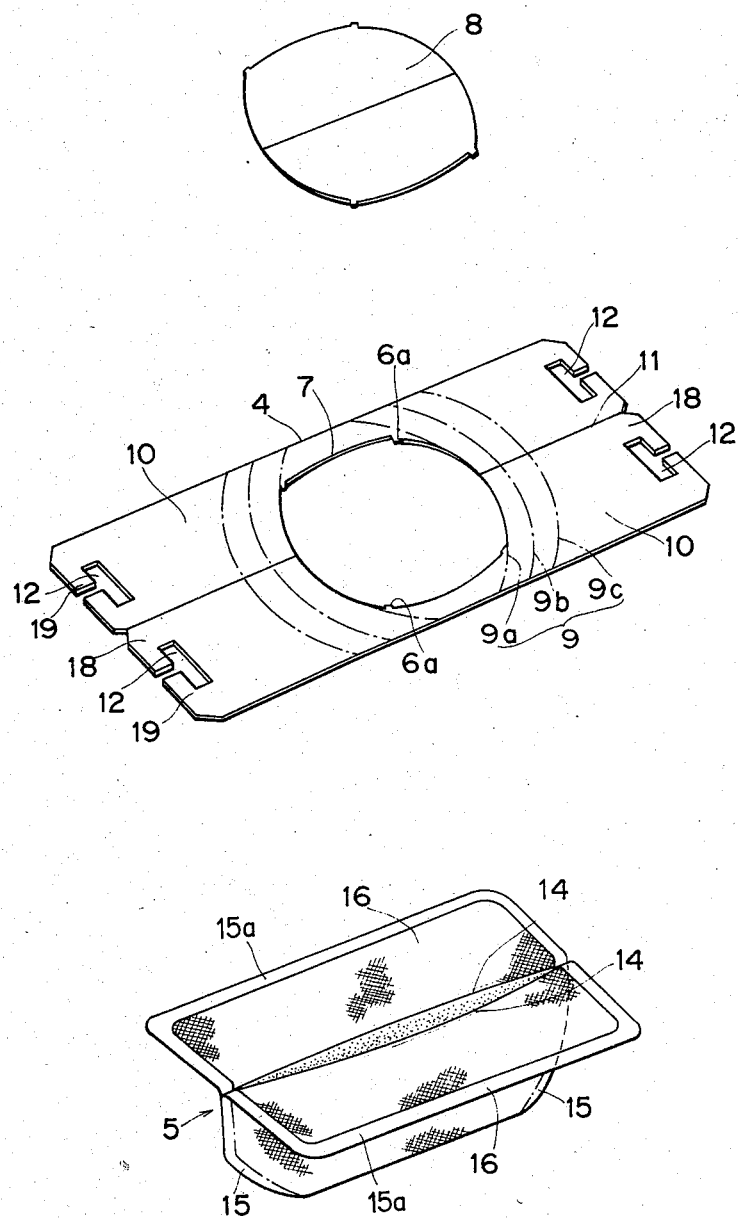
FIG. 5 is an exploded perspective view of the filter assembly.

Referring to FIGS. 1-5 of the drawings, there is shown one embodiment of the coffee package according to the present invention. The coffee package is generally made up of a wrapper 1 and a filter assembly 2 which is hermetically enveloped in the wrapper 1 together with a weighed volume of coffee powder 3.

The filter assembly 2 comprises a support or base plate 4 which is an approximately rectangular piece cut from a sheet having a desired rigidity, e.g. a thick paper sheet or a sheet of plastic. A sack of filter paper 5 made of viscose, for example, is carried on the back of the support plate 4 by adhesion. As best shown in FIG. 4, the support plate 4 has in its intermediate portion a generally circular removable lid 8 which is defined by discontinuous cuts or slits 6. The lid 8 is integral with the rest of the support plate 4 through non-slitted portions 6a. When removed, the lid 8 will leave a generally circular opening 7 which serves for pouring hot water as will be described. A plurality of parallel fold lines 9 are formed at each side of the lid 8 in symmetric relation with those at the other side. The fold lines at the opposite sides of the lid 8 define opposite side edge portions of the support plate 4 in cooperation with the corresponding ends of the latter. A pair of symmetrically shaped support legs 10 are formed in these edge portions of the support plate 4, respectively.

Figure 28:
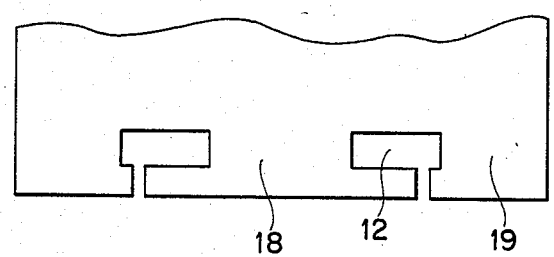
FIGS. 28-30 are fragmentary plan views of support plates which are formed with notches different from those shown in FIG. 4, respectively.
Figure 29:
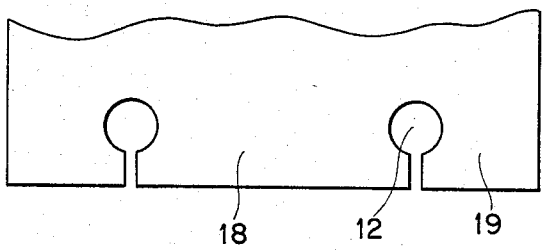
Figure 30:
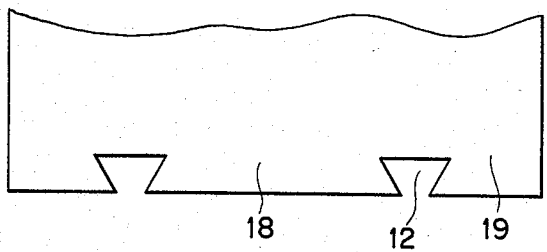

The support plate 4 with the lid 8 and a pair of legs 10 is foldable into two along the longitudinal centerline 11 thereof. As shown, each support leg 10 is formed with generally T-shaped slots 12 in positions which are symmetric to each other with respect to the centerline 11. In detail, each of the T-shaped slots is made up of a slit 12a extending inwardly from the corresponding edge of the leg 10 and a generally rectangular opening 12b at which the slit 12b terminates; the opening 12b is elongate in a direction perpendicular to the slit 12a and parallel to the edge of the leg 10. These slots 12 serve their specific function when the filter assembly is placed on a cup or like receptacle as will be described. It will be noted that, instead of the T-shape, the slot 12 may have any other shape which connects to the edge of the leg 10 through a relatively small width and has a relatively wide inboard edge, e.g. an L-shape (see FIG. 28), a keyhole shape (see FIG. 29) or a trapezoid (see FIG. 30).

The paper filter 5 is made of viscose, for example, and formed as a flat sack for storing the coffee powder 3 therein. As shown in FIG. 6, the filter sack 5 is prepared by cutting a generally rectangular piece from filter paper, folding the cut piece along its central axis line 13, and sticking together the opposite lateral edges 15 between the central axis line 13 and axis lines 14 substantially intermediate between the axis line 13 and upper and lower ends of the cut piece. The sack is thus open at its upper end along the intermediate axis lines 14. Flaps 16 extending outward from the individual intermediate axis lines 14 are laid on the back of the support plate 4 and individually adhered thereto along their edges 15a. This completes the integral assembly of the filter sack 5 with the support plate 4. In a normal situation, the filter sack 5 is mounted to the underside of the support plate 4 keeping its opening closed as viewed in FIG. 5 with the opposite edges of the opening held in parallel contact. The dimension of this opening in the longitudinal direction of the plate 4 is preselected to be greater than the spacing between the fold lines 9c on the support plate 4. Also, the facing edges of the flaps 16 are spaced from each other by a distance which is larger than the diameter of the lid 8 of the support plate 4. The filter sack 5 thus calibrated is adhered to the back of the support plate 4 such that the axis lines 14 defining the edges of the opening are aligned with the longitudinal centerline 11 of the support plate 4 while the open end of the sack is located just beneath the lid 8 along the longitudinal centerline of the plate 4. When the flaps 16 are adhered to the support plate 4, the opening in the sack will become closed by the lid 8 and the immediate vicinity of the support plate 4.

Before bonded to the support plate 4, the filter sack 5 is filled with a predetermined volume of coffee powder 3. Bonding the filter sack 5 to the support plate 4 confines the coffee powder 5 within the sack.

The filter assembly thus constructed is enveloped in the wrapper with the coffee powder 3 confined in the filter sack 5. In this embodiment, the filter assembly 2 is enveloped in the wrapper 5 holding the filter sack 5 with the powder inside the double folded support plate 4. Subsequently, the interior of the wrapper 1 is evacuated or filled with an inert gas after evacuation to seal the filter assembly 2 air-tight therein.

In this way, the coffee powder 3 stored in the wrapper 1 is placed in an evacuous or inert gas atmosphere which is fully isolated from the outside air. The powder 3 therefore is effectively maintained fresh almost indefinitely and ready to yield fresh liquid coffee when desired.

The coffee powder 3 is sealed within the wrapper 1 after being confined in the filter sack 5 of the filter assembly 2. Therefore, when air is to be expelled from the interior of the wrapper 1 to evacuate it or fill it with an inert gas, there is no fear of the powder being sucked out together with the air. This promotes reliable evacuation of air. Moreover, full evacuation is achievable in the wrapper 1 because the powder is confined in the filter sack 5 which has a high air permeability.

As discussed in connection with the embodiment, the filter assembly 2 is enveloped in the wrapper 1 with the filter sack 5 held between the folded parts of the suitably rigid support plate 4. The support plate 4 thus protects the filter paper which is susceptible to impacts. This safeguards the filter sack 5 against breakage during transportation. Furthermore, the foldable design renders the filter assembly 2 compact and thereby reduces the overall size of the coffee package. Such coffee packages can be packed in boxes or carried by persons with ease.

Apart from advantages from the packing aspect, the coffee package of the invention offers drip coffee in quite a simple and hygienic manner by virtue of the integral provision of coffee powder and filter inside a wrapper.

Figure 7:
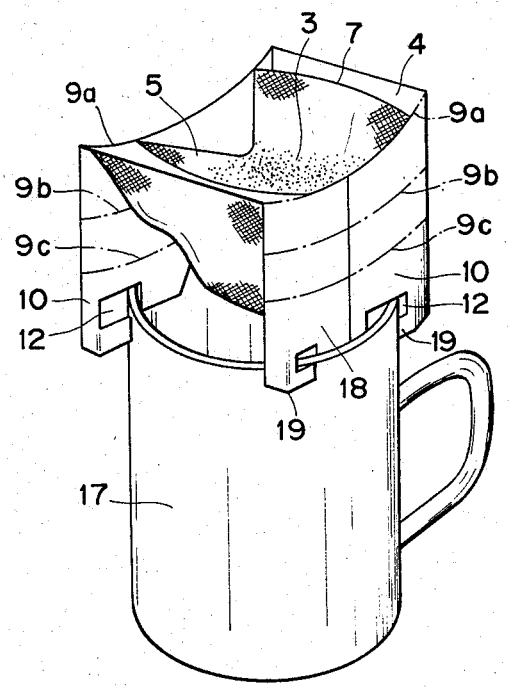
FIGS. 7-9 are views illustrative of various ways in which the coffee package can be used.
Figure 8:
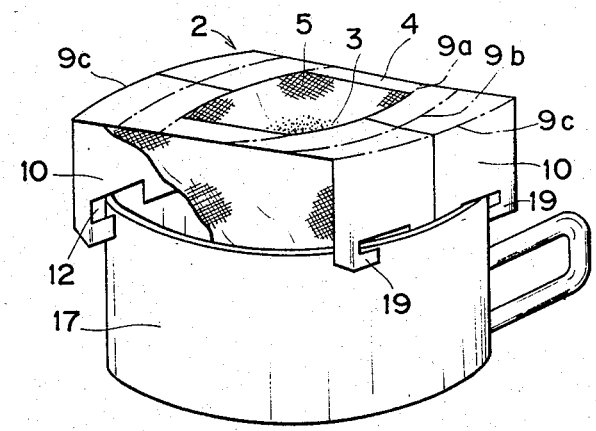
Figure 9:
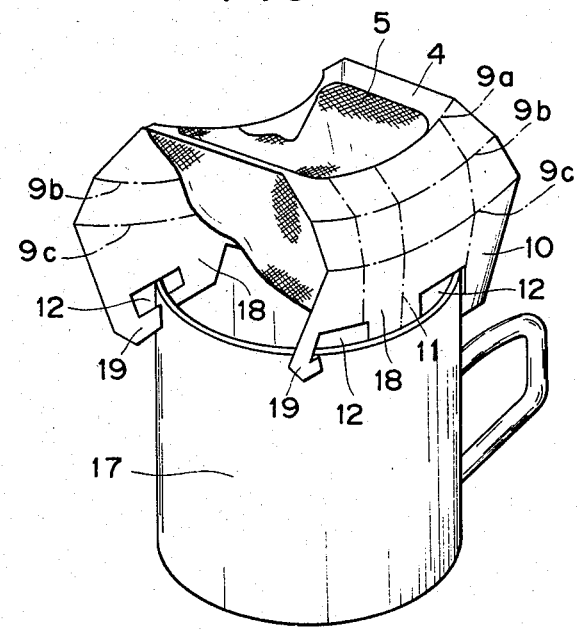

In detail, while the coffee package of the invention is storable for a long time and very handy, a coffee liquid can be extracted therefrom merely by unsealing the wrapper 1, taking out the filter assembly 2, placing the filter assembly 2 on a coffee cup or like receptacle and pouring hot water into the filter assembly 2 since the coffee powder 3 is accommodated in the filter assembly 2 before sealed in the wrapper 1. FIGS. 7-9 show various way in which the coffee package can be used by way of example. First, the wrapper 1 is unsealed and the filter assembly 2 is taken out. The support plate 4 of the filter assembly 2 is developed flat as viewed in FIG. 4 whereupon the non-slitted portions 6a are cut or broken to remove the lid 8 and thereby open the mouth 14 of the filter sack 5. Then, the support legs 10 on the support plate 4 are bent downwardly substantially perpendicularly to the rest of the support plate 4 by folding them along the desired pair of fold lines 9. Under this condition, the support plate 4 is caused to stand on the edge of a cup 17 through the slots 12 in the legs 10, followed by pouring hot water into the filter assembly 2.

It will be seen from FIGS. 7–9 that the coffee package can accommodate various diameters of cups 17 due to the concentric fold lines 9 on the support plate 4. In FIG. 7, the legs 10 are bent along the innermost fold line pair 9a to become compatible with a cup of a relatively small diameter while, in FIG. 8, they are bent along the outermost fold line pair 9c to match with a cup of a relatively large diameter. FIG. 9 shows a specific case in which each leg 10 is curved by folding the support plate 4 along the innermost fold line 9a and then slightly folding the intermediate and outermost fold lines 9b and 9c. This will effectively match the configuration of the filter assembly 2 to an upwardly flared edge of a cup 17 as viewed in FIG. 9, that is, the filter assembly can be safely placed on any cup though none of the fold lines 9 may be compatible with the cup diameter. The thus framed support plate 4 is securely placed on the edge of the cup 17 utilizing the slots 12 in the legs 10. Inboard fingers 18 of the legs 10 are inserted into the cup 17 while the outboard fingers 19 are positioned outside the cup 17, holding the cup edge from both sides thereof.

Since the fold lines 9 in this embodiment are formed arcuately, bending the legs 10 upright automatically provides them with a rigidity great enough to support the entire assembly. Meanwhile, since the opposite ends of the filter sack 5 are adhered to the support plate 4 over to its support legs 10, such framing of the support plate 4 brings the opposite ends of the filter sack 5 toward each other so that the upper end of the filter sack 5 is automatically opened to promote easy pouring of hot water.

Thus, the filter assembly 2 can be framed and set upright on a cup by simple manipulation and liquid coffee can be received automatically by the cup simply by pouring hot water thereinto. This promotes quite easy handling of the filter assembly 2. The framed filter assembly 2 stands upright on a cup so that one can see the filter sack 5 and the interior of the cup through between the support legs 10 to check the state of extraction.

The coffee powder 3 which is confined in the filter in advance can be processed under hygienic conditions, eliminating the need for handling. Also, the coffee powder 3 can be weighed in advance to match with a predetermined number of persons. This automatically permits one to obtain a specific consistency of coffee or be informed of an optimum consistency provided that a size of coffee cups is specified to thereby specify an amount of hot water to be poured.

While various materials are usable to form the wrapper 1, suitable ones are a film, of plastic or a composite film prepared by laminating an aluminum foil on a plastic film in view of the need to maintain its interior airtight. The use of such a film will facilitate the sealing operation because it is heat-sealable.

In the illustrated embodiment, the support plate 4 has the lid 8 which is formed by the substantially annular slits 6 to define the substantially circular opening 7 when removed from the support plate 4; the opening 7 is kept closed as long as the filter assembly is sealed in the wrapper 1. This lid 8 may be omitted if a filter sack closes its mouth when folded as depicted in FIG. 16. It will be apparent that the lid 8 removable from the support plate 4 is not limitative in any way but may be replaced by a separate film which removably covers the opening 7.

The support plate 4 is provided with fold lines 9 to form the support legs 10. As will be apparent from the discussion, these fold lines serve as cardinal points and standards for bending the support legs 10 upright. In practice, they may be formed on the support plate 4 by perforations, shallow cuts or pressed lines.

Figure 10:
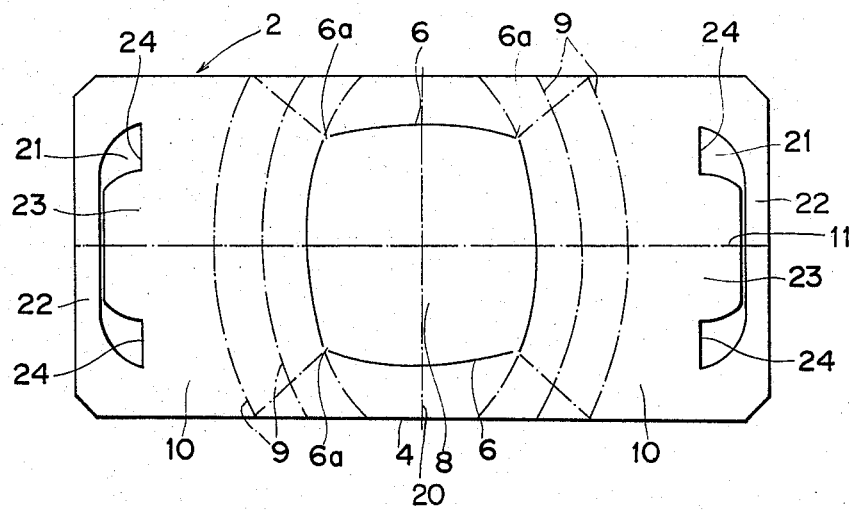

FIGS. 10–12 illustrate other examples of the nipping portions which are defined at the support leg ends of the filter assembly applicable to the present invention. In FIG. 10, the support legs 10 are formed with generally U-shaped cuts or slots 21 which are located in the vicinity of edges of the support legs 10 in symmetric relation to each other with respect to the longitudinal centerline 11 of the support plate 4. Each of these slots 21 is so shaped as to define an inner nipping tongue 23 at the inboard end of the U-shape and an outer nipping strip 22 at the outboard end of the same. Also, each slot 21 has a symmetric configuration with respect to the transverse centerline 20 of the support plate 4. To fix the filter assembly of FIG. 10 on a receptacle, the outer nipping strips 22 are engaged with the outer periphery of the upper edge of the receptacle, the support legs 10 are manually depressed inwardly at their surfaces to cause the inner nipping tongues 23 into their inwardly protruded positions, and then the assembly is bodily lowered until the opposite edges 24 of the slots 21 become seated on the upper edge of the receptacle. Such a simple procedure suffices for establishing sure locking engagement of the inner and outer nipping members 23, 22 with the receptacle.

FIG. 11 shows a modified form of the example indicated in FIG. 10. In FIG. 11, the U-shaped slot 21 extends perpendicular to the longitudinal centerline 11 of the support plate 4 adjacent to each edge of the latter, defining the inner nipping member 23 thereinside. The inner nipping member 23 in this embodiment is notched at its intermediate portion to have a pair of lugs 25 which extend outward from an inboard end 26 of the slot 21. The lugs 25 at each support leg are symmetric to each other with respect to the longitudinal centerline 11 of the support plate 4 and opposed by the corresponding outer nipping strip 22, which is also defined by the slot 21. With this arrangement, the filter assembly is securely supported on a receptacle at three points in each of the opposite support legs: two at the lugs 25 which are engagable with the inner surface of a receptacle and one at the nipping strip 22 which is engagable with the outer surface of the same in such a manner as to intimately embrace along a curvature of the receptacle. This retains the whole assembly upright on a receptacle in a more stable fashion. The engagement of the filter assembly with a receptacle achievable with such a construction is hardly affected by a change in the receptacle diameter, always ensuring the stable raised position of the filter assembly.

FIG. 12 illustrates a nipping portion which is a modified version of the nipping portion shown in FIG. 11. In FIG. 12, cuts 27 extend toward each other from outboard base ends of the lugs 25 at each inner nipping member 23 to define small elastic pieces 28. These cuts 27 render the lugs 25 at the inner nipping member 23 readily flexible to become compatible even with receptacles of relatively small diameters.

Additionally, each outer nipping strip 22 in FIG. 12 includes a pair of small projections 29 which bulge from opposite ends of the nipping strip 22 to face the inner nipping member 23. Consequently, the inner and outer nipping members at each support leg 10 support the filter assembly at four points on a receptacle, which is superior in nipping strength to the three-point support of FIG. 11. It will be apparent that such small projections 29 are applicable also to the configuration shown in FIG. 10 or 11.

Figure 13:
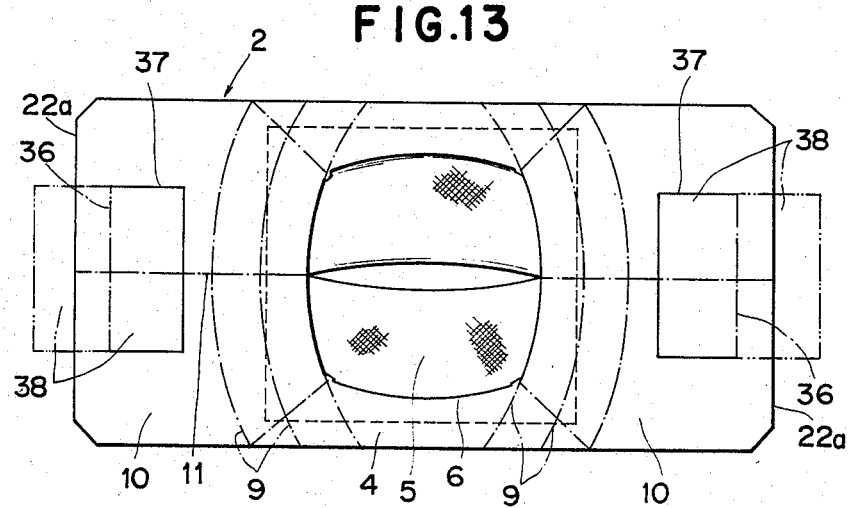
FIG. 13 is a plan view of another example of the filter assembly.
Figure 14:
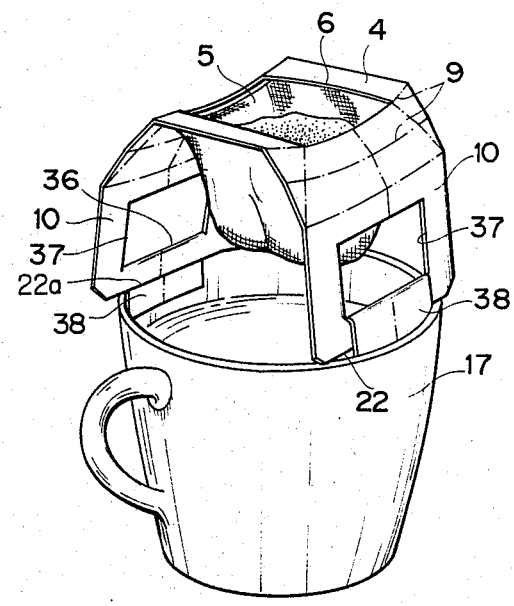
FIG. 14 is a perspective view showing the filter assembly of FIG. 13 in use.

Referring to FIGS. 13 and 14, each support leg 10 is provided with a fold line 36 in parallel with its edge 22a. It is also provided with a generally U-shaped slit 37 which connects to the opposite ends of the fold line 36 such that the bottom of "U" is remote from the edge 22a. The slit 37 forms an inner nipping tongue 38 which can be raised relative to the rest of the leg 2 as will be described.

The distance between the fold line 36 and the confronting part of the slit 37 is selected to be larger than the distance between the fold line 36 and the leg edge 22a. This dimensional relation causes the free end of the nipping tongue 38 to protrude outward beyond the edge 22a when turned over along the fold line 36 toward the edge 22a. The tongues 38 which are bent 180° outwardly along the fold lines 36 are allowed to pressingly engage with the receptacle due to their own returning forces, thus retaining the filter assembly in a stable manner.

The tongues 9 leave windows of complementary shapes in the associated support legs 10 when so turned over to their supporting positions. Hence, one can observe the varying liquid level in the receptacle 10 far more clearly through these windows.

Figure 15:
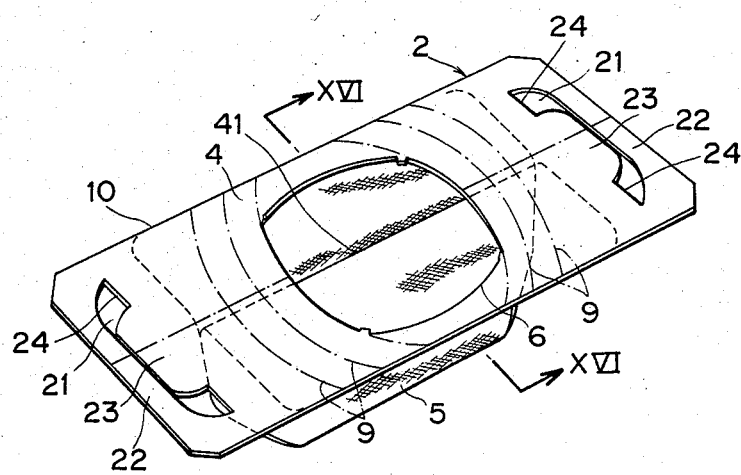
FIG. 15 is a plan view of a filter assembly showing a manner of use of a filter sack associated therewith.

In FIGS. 15 and 16, the filter sack 5 is provided with flaps 16 which extend outward away from each other from opposite edges 41 of the open end of the filter sack 5. The filter sack 5 is securely connected to the support plate 4 by adhering the flaps 16 to the back of the support plate 4 along their peripheral edges 15a. At the edges 41, the filter sack 5 has its facing inner surfaces separably connected together as by adhering, pressing or heat-sealing them together in order to confine a predetermined volume of coffee powder or the like 3 thereinside.

In the arrangements shown in FIGS. 1-9, the opening 7 for pouring hot water is closed by a lid 8. It will be seen that the opposite edges 41 of the filter sack 5 need be adhered together if the opening concerned is void of the lid 8.

Where a wrapper containing the filter sack is to be made vacuous for air-tight sealing, the embodiment described above offers another advantage that the closed end of the filter sack prevents its content from being sucked out by a vacuum while permitting air alone to be removed.

Preferably, the interconnection of the opposite ends of the open sack end should be of an intensity low enough for a person to easily separate with the fingers without damaging the filter paper.

Figure 17:
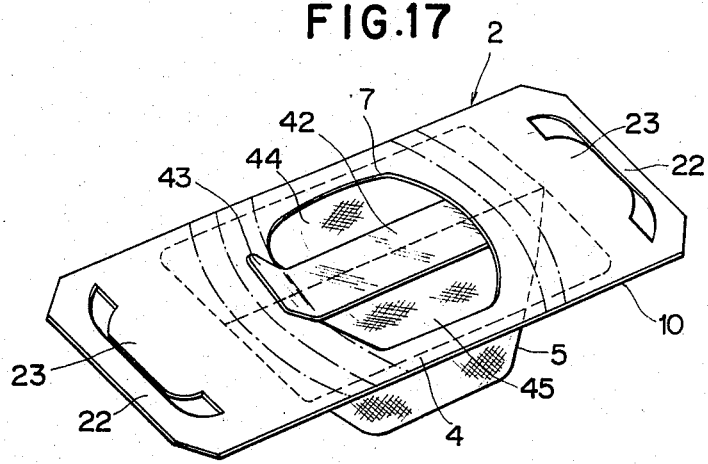
FIG. 17 is a perspective view of a filter assembly showing an implement for sealing a filter sack.
Figure 18:
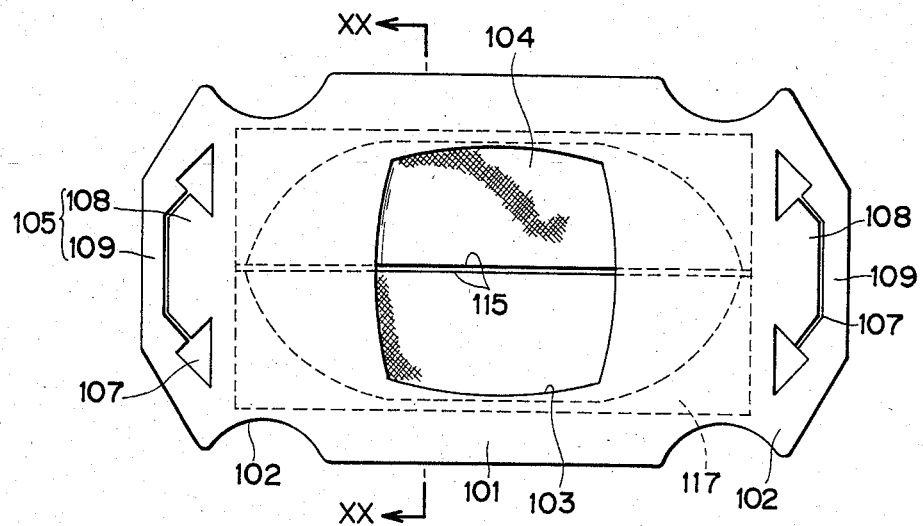
FIGS. 18-20 are a plan view, a front view and a section along line XX—XX of FIG. 18, respectively, showing another example of the filter assembly, particularly its filter sack.
Figure 19:
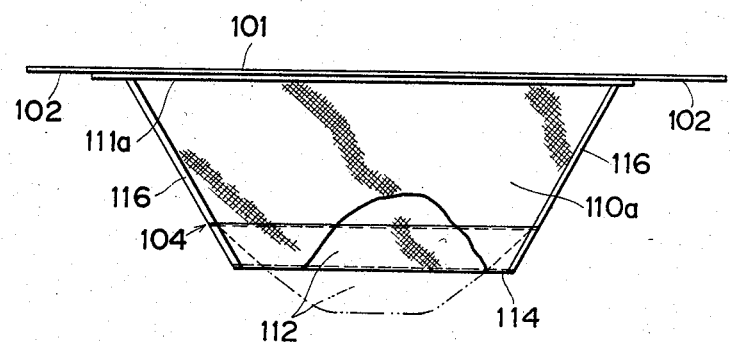
Figure 20:
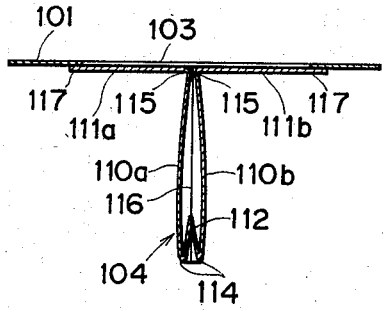
Figure 21:
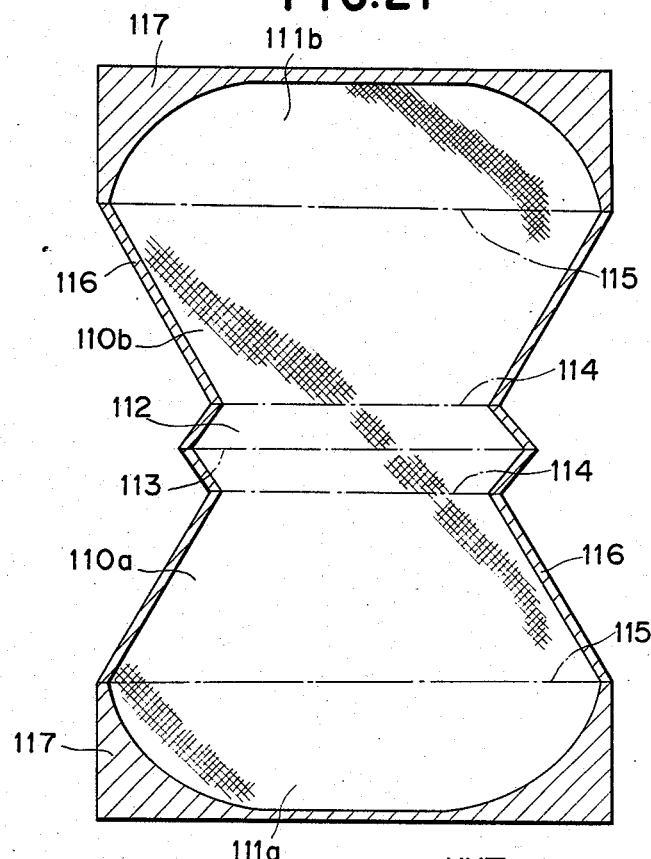
FIG. 21 is a development of the filter sack of FIGS. 18-20.
Figure 24:
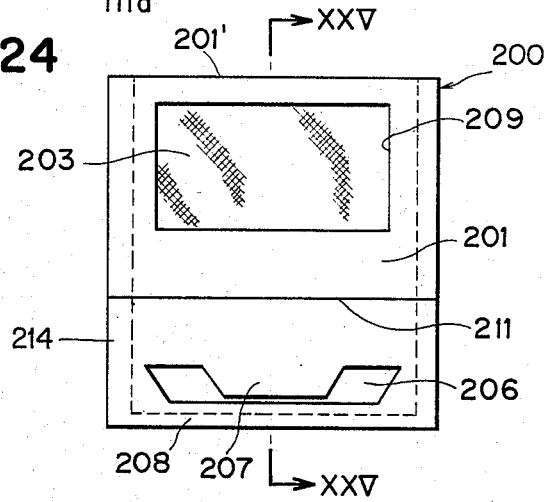
FIG. 24 is a plan view of another example of the filter assembly of the present invention, the filter assembly being in a double folded position.

As illustrated in FIG. 17, the lid member for stopping the opening of the filter sack may be replaced by an elongate strip 42 which is separably and sealingly adhered to the upper surfaces of the flaps 44 and 45 along the open edges of the sack portion which faces the opening 7. Furthermore, such a strip type lid member 42 may include a thumb piece 43 at its one end which protrudes outward from the opening 7. The thumb piece 43 will facilitate separation of the lid 42 which renders the whole assembly far easier to handle.

Referring to FIGS. 18-23, the filter assembly comprises a support plate 101 common in structure to that shown in FIG. 10. Support legs 102 extend from both side edges of the support plate 101. The support plate 101 is formed with an opening 103 in its intermediate area for pouring hot water therethrough. A sack of filter paper 104 is adhered to the underside of the support plate 101 with its open end faced by the opening 103.

The support plate 101 and support legs 102 are formed as an integral rectangular piece by cutting them from a single sheet material. While the support plate and support legs are cut from a sheet, each of the support legs is formed with a nipping portion 105.

The nipping portions 105 at the individual legs 102 are adapted to fix the filter assembly in place on a receptacle 106 as will be described. In this embodiment, each nipping portion 105 is formed with a generally U-shaped slot 107 adjacent to its end. The slot 107 is so shaped as to define an inner nipping tongue 108 and an outer nipping strip 109 which are integral with the rest of the support leg 102.

In accordance with this embodiment, the filter sack 104 is made up of opposite side walls 110a, 110b, flaps 111a, 111b extending individually from the side walls 110a, 110b, and a connector strip 112 connecting the side walls together.

A procedure for forming the filter sack 104 comprises double folding the sheet along the centerline 113 of the connector strip 112, turning over the side walls 110a, 110b at the opposite edges 114 of the connector strip 112 in opposite directions while causing the rest to contact each other with the connector strip 112 interposed therebetween, turning over the flaps 111a, 111b outwardly, and bonding the side walls 110a, 110b along their side edges 116 together with side edges of the connector strip 112 which are overlaid on the former. Thus, the filter sack 104 is in the form of a flat sack whose bottom is defined by the connector strip 112. The edges 114 of the connector strip 112 define lower edges of the side walls 110a, 110b. The upper edge 115 of each side walls defines an edge of an opening so that the flaps 111a and 111b extend from the edges of the open end of the sack.

In assembly, the filter sack 104 is placed beneath the support plate 101 such that the adjacent upper edges 115 of the side walls 110a, 110b are aligned with the centerline of the support plate 101. The flaps 111a, 111b extending from the edges 115 are laid in face-to-face contact on the underside of the support plate 101 and those of the adjacent legs 102. In this position, the flaps 111a, 111b are adhered to the support plate and its associated legs along the peripheral edges 117.

Before use, the filter assembly will have the side walls 110a, 110b of the filter sack 104 kept in contact and in a flat position with the connector strip 112 tucked therebetween. The filter sack 104 in this position can be bodily folded toward either one of the flaps 110a, 110b into contact with the underside of the support plate 101 in order to make the whole assembly flat.

When the support legs 102 at the opposite sides of an intermediate portion of the support plate 101 are bent downwardly, the side walls 110a, 110b of the filter sack 104 become loosened along their upper edges 115 due to the inherent structure of the filter sack described hereinabove. This automatically opens the filter sack 104 and, at the same time, brings the opposite side edges 116 closer to each other to thereby expand the filter sack 104.

The thus framed filter assembly is positioned above a receptacle 106 such that the ends of the support legs 102 face the upper edge of the receptacle 106. Then, the nipping strip 109 at each leg 102 is caused to engage with the outer surface of the receptacle 106 and the nipping tongue 108 with the inner surface of the same. As viewed in FIG. 22, the strip 109 and tongue 108 nip the wall of the receptacle 106 from outside and inside whereby the filter assembly is firmly secured to the receptacle.

When the filter assembly is fixed in place on the receptacle 106, the weight of the coffee powder causes the folded connector strip 112 to unfold and hang down from the lower edges of the side walls 110a, 110b as seen in FIG. 6. As a result, the filter sack 104 is deformed from the flat shape to a bowl shape.

It will be seen from the foregoing that the filter assembly according to this embodiment can be bodily folded flat and, in use, its filter sack is automatically opened and transformed by the weight of the enveloped coffee powder into a downwardly pointed cone. The tip of the cone, that is, the center of the bottom of the filter sack 104 collects all the flows of liquid coffee provided by pouring hot water into the filter sack.

The liquid coffee is therefore prevented from dropping into the areas outside the receptacle from side portions of the filter sack. Also, the increase in the filtering area entailed by the expansion of the connector strip 12 promotes an efficient filtering operation.

While the connector strip 112 of the filter assembly 104 may have any desired width, it must be integrally bonded to the edge 116 of the side walls along its lateral edges. It is preferable that the side walls 110a, 110b keep their lower edges non-protruded from the peripheral edge of the support plate 101 and support legs 102 when in their folded position.

Referring to FIGS. 24–27, a coffee package according to still another embodiment of the invention includes a support plate 200 and a sack of filter paper 203 for storing coffee powder 204. The support plate 200 has a pair of inclined sections 201, 202 in its intermediate portion which converge upwardly toward each other. The inclined sections 201, 202 have identical rectangular shapes and connected together along their upper edges 201', 202' by a connecting strip 205. The sections 201, 202 are foldable along the edges 201', 202' into a generally inverted V-section. The sections 201, 202 extend downward to connect to support legs 214 through fold lines 211, 212, respectively. Each support leg 214 is formed with a generally U-shaped slot 206 along and adjacent to its end in the same position as the other. The U-shaped slot 206 is so configured as to define an inner nipping tongue 207 and an outer nipping strip 208 which are integral with the rest of the support leg. The inclined section 201 is provided with a rectangular opening 209 for pouring hot water therethrough. The filter sack 203 is carried on the back of the inclined section 201.

The filter sack 203 is adhered to and suspended from the inclined section 201 along the edges which define an open end of the filter sack 203, in such a manner as to surround the opening 209. The whole filter sack 203 is accommodated between the double folded support plate 200. The filter sack 203 is also locally adhered as at 210 to the back of the other inclined section 202 and, hence, it is suspended from both of the inclined sections 201, 202.

The fold lines 211, 212 extend transversely between the inclined sections 201, 202 and the support legs 214, respectively.

When the filter assembly thus constructed is out of use, it is handled in the flat position with the filter sack 203 held inside the double folded support plate 200. In use, the support plate 200 is unfolded and its support legs 214 are fixedly mounted on the upper edge of a coffee cup or like receptacle.

Figure 26:
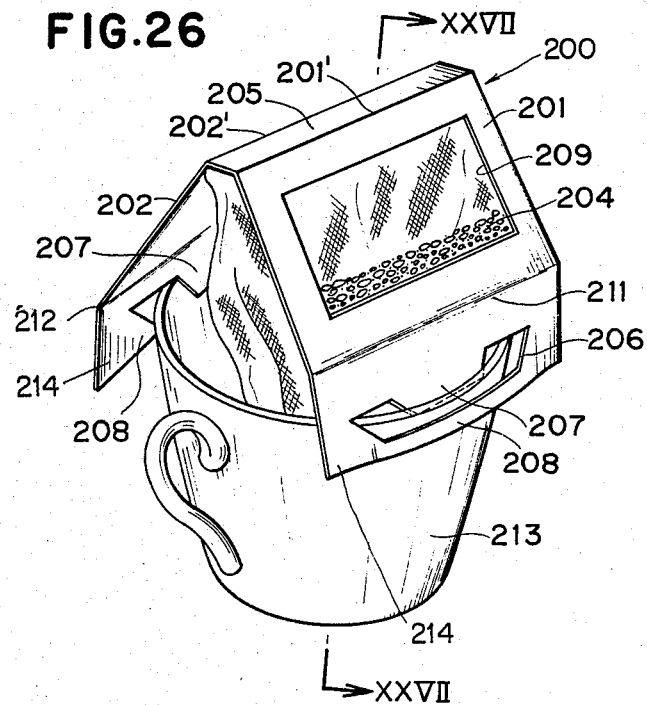
FIG. 26 is a perspective view showing the filter assembly of FIG. 24 in use.
Figure 27:
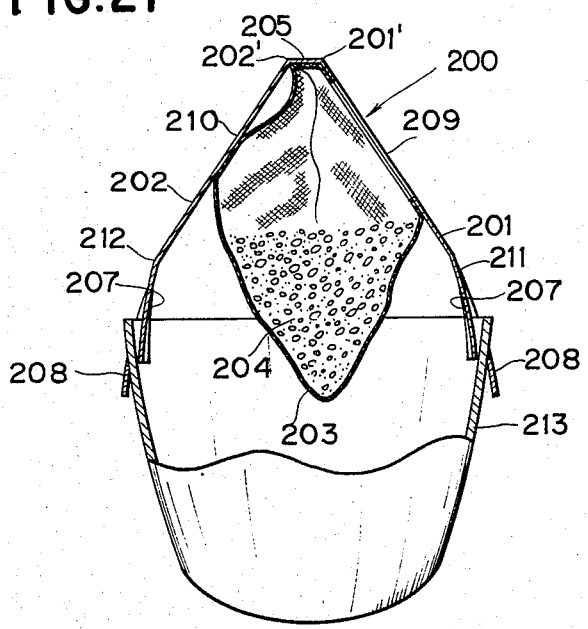
FIG. 27 is a section taken along line XXVII—XXVII of FIG. 26.

A manner of use of such a filter assembly is demonstrated in FIGS. 26 and 27. When the support plate 200 is moved from the folded position to the unfolded or opened position, the filter sack 203 is pulled at the adhered spot 210 to automatically expand itself. Located above a receptacle 213, the filter assembly first has its nipping strip 208 engaged with the outer edge surface of the receptacle 213 and then its nipping tongue 207 thrusted into the receptacle. In this condition, the filter assembly fixed in place on the receptacle 213 with the tongue 207 and strip 208 nipping the receptacle from inside and outside, respectively. Subsequently, hot water is poured into the filter sack 3 to filter a given volume of coffee 204 to extract liquid coffee directly into the receptacle 213. The distance between the opened support legs is determined as desired depending on the diameter of the receptacle 213. To ensure more stable position of the filter assembly on the receptacle 213, the support plate 200 may be bent along its fold lines 211, 212 until the corresponding nipping members 207 and 208 extend as straight as possible in the rising direction of the edge of the receptacle 213.

It will be seen from the foregoing that the filter assembly of this embodiment is quite handy and readily storable since it can be folded flat when out of use. The filter assembly in use can be easily built on a receptacle since it stands automatically thereon only if its support plate is opened to a distance compatible with a specific receptacle size and then the inner and outer nipping members 207 and 208 are positioned to nip the receptacle therebetween.

In summary, it will be seen that the present invention provides a coffee package which always permits one to enjoy a necessary amount of dripped coffee in an easy way while maintaining a coffee powder fresh therein over a long period of time before use. This is because the coffee powder and its associated filter assembly are hermetically sealed in a wrapper as an integral unit under a vacuous or inert gas atmosphere. It will also be seen that, since the wrapper is formed of a plastic film with or without lamination of a metal film, it can be sealed and unsealed with ease and produced economically.

What is claimed is:

1. A coffee package comprising a filter assembly composed of an elongated planar plate of material having a longitudinal centerline and a predetermined rigidity and including a paper sheet, said elongated planar plate having a first side and a second side, said elongated planar plate having a plate opening for pouring hot water therethrough in an intermediate portion thereof, and a filter sack containing a predetermined volume of coffee powder therein; said filter snack being composed of a sheet of filter paper folded in two to form first and second flaps, first adhering means for releasably adhering said first and said second flaps together at a predetermined intermediate point which is spaced from the folding point to form a closed sack which is openable at said intermediate point by overcoming said first adhering means and releasing one flap from another to form a passage into the interior of the filter sack, said intermediate point being adjacent to with said plate opening so that said passage coincides with said plate opening and is also aligned with the longitudinal centerline of said planar plate, said flaps being folded back from said predetermined intermediate point into a configuration which positions said flaps essentially coplanar with each other, second adhering means for affixedly adhering the margins of said first and second flaps to said second side of the elongaged planar plate. therealong to surround said plate opening, said elongated planar plate being folded to envelop the filter sack therebetween; and an air-tight wrapper sealing said filter assembly.

2. A coffee package according to claim 1, wherein said elongated plate is marked with at least a pair of fold lines symmetrically on both sides of the filter paper sack, said fold lines enabling said plate to be folded and define leg sections at opposite end portions of the elongated plate.

3. A coffee package according to claim 2, wherein the open end of the filter paper sack partly extends to said leg sections.

4. A coffee package as claimed in claim 2, in which the elongated plate is double folded along a central fold line which is perpendicular to the longitudinal direction of the elongated plate.

5. A coffee package as claimed in claim 4, in which the elongated plate has the section for pouring hot water in either side of a central fold line thereof.

6. A coffee package as claimed in claim 2, in which the elongated plate is double folded along a longitudinal central fold line thereof.

7. A coffee package as claimed in claim 2, in which a filter assembly is included which is formed with at least one cut or slot adjacent to the edge of each leg section which is symmetric with respect to the longitudinal centerline of the elongated plate, said slot defining an inner nipping member and at least one outer nipping member.

8. A coffee package as claimed in claim 7, in which the leg section is formed with a pair of slots each extending inwardly from the edge of the leg section, each of the slots connecting to the edge of the leg section through a relatively narrow width and having an inboard end which is wider than said width.

9. A coffee package as claimed in claim 7, in which the leg section is formed with a generally U-shaped slot spaced from the edge of the leg section.

10. A coffee package according to claim 2, wherein each fold line is arcuated to surround said hot water pouring section.

11. A coffee package according to claim 1, wherein said air-tight wrapper is vacuumized.

12. A coffee package according to claim 1, wherein said air-tight wrapper is filled with an inert gas.

13. A coffee package according to claim 1, wherein said elongated plate has a removable lid which when removed defines an opening to provide communication with said sack at said hot water pouring section.

14. A coffee package as claimed in claimed 1, in which the elongated plate has a substantially rectangular shape.

15. A coffee package as claimed in claim 1, in which the section for pouring hot water is defined by four arcs.

* * * * *